United States Patent [19]
Werner

[11] Patent Number: 6,151,074
[45] Date of Patent: Nov. 21, 2000

[54] INTEGRATED MPEG DECODER AND IMAGE RESIZER FOR SLM-BASED DIGITAL DISPLAY SYSTEM

[75] Inventor: William B. Werner, Plano, Tex.

[73] Assignee: Texas Instruments Incorporated, Dallas, Tex.

[21] Appl. No.: 08/938,489

[22] Filed: Sep. 30, 1997

[51] Int. Cl.[7] .............................. H04N 7/01; H04N 9/74; H04N 7/00; G09G 5/00

[52] U.S. Cl. ...................... 348/425.1; 348/443; 348/458; 348/845; 348/581; 345/127; 345/154; 345/202

[58] Field of Search ..................................... 348/458, 443, 348/445, 581, 561, 562, 704, 845; 345/127, 154, 202

[56] References Cited

U.S. PATENT DOCUMENTS

| | | | |
|---|---|---|---|
| 5,822,024 | 10/1998 | Setogawa et al. | 348/845 |
| 5,831,592 | 11/1998 | Cahill, III | 345/127 |
| 5,832,120 | 11/1998 | Prabhakar et al. | 382/233 |
| 5,874,937 | 2/1999 | Kesatoshi | 345/127 |

*Primary Examiner*—John K. Peng
*Assistant Examiner*—Paulos Natnael
*Attorney, Agent, or Firm*—Charles A. Brill; Wade James Brady, III; Frederick J. Telecky, Jr.

[57] ABSTRACT

A video processing unit (13) that decodes compressed video data and resizes the image represented by the video data. The video processing unit (13) has two processing engines—a decoding engine (24) and a scaling engine (25), which share a memory (23). A memory manager (22) handles data requests from the two engines, and handles reading and writing of the memory (22).

15 Claims, 1 Drawing Sheet

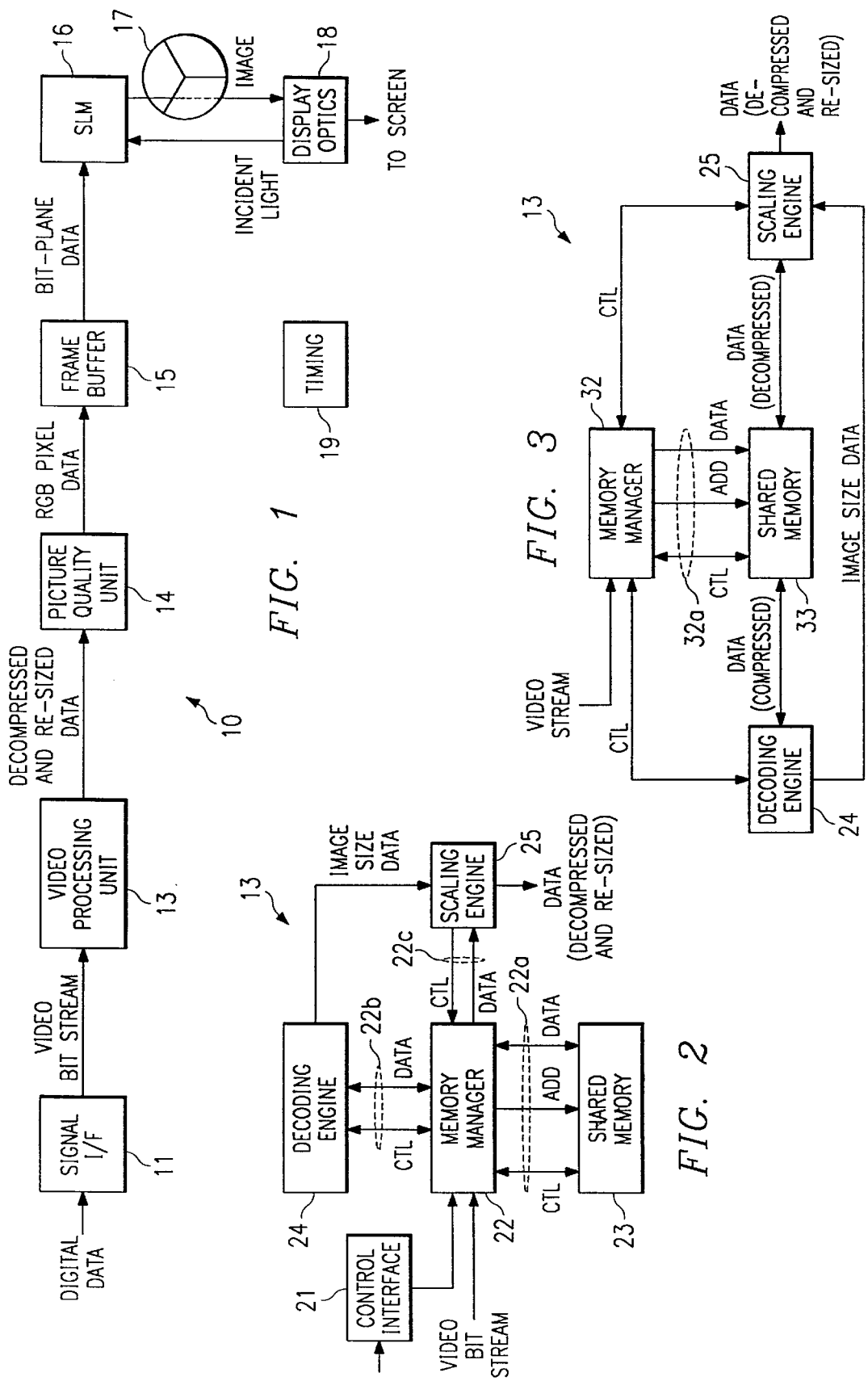

INTEGRATED MPEG DECODER AND IMAGE RESIZER FOR SLM-BASED DIGITAL DISPLAY SYSTEM

TECHNICAL FIELD OF THE INVENTION

This invention relates to image display systems that use spatial light modulators (SLMs), and more particularly to an integrated circuit for decoding compressed input signals to generate images and for resizing the images to match the SLM display size.

BACKGROUND OF THE INVENTION

Video display systems based on spatial light modulators (SLMs) are increasingly being used as an alternative to display systems using cathode ray tubes (CRTs). SLM systems provide high resolution displays without the bulk and power consumption of CRT systems. They are all-digital, with both digital processing and display. In other words, a digital input signal can be received, or an analog signal can be received and digitized, with subsequent processing and display of the data in digital form.

Digital micro-mirror devices (DMDs) are a type of SLM, and may be used for display applications. A DMD has an array of micro-mechanical display elements, each having a tiny mirror that is individually addressable with an electronic signal. Depending on the state of its addressing signal, each mirror tilts so that it either does or does not reflect light to the image plane. The mirrors are often referred to as "pixels", to correspond to the pixels of the image they generate, but they are more correctly referred to as "display elements". Generally, displaying pixel data is accomplished by loading memory cells connected to the display elements. Each memory cell receives one bit of data representing an on or off state of a display element. The display elements can maintain their on or off state for controlled display times.

Other SLMs operate on similar principles, with an array of display elements that may emit or reflect light simultaneously, such that a complete image is generated by addressing display elements rather than by scanning a screen. Another example of an SLM is a liquid crystal display (LCD) having individually driven display elements.

For all types of SLMs, motion displays are achieved by updating the data in the SLM's memory cells at sufficiently fast rates. To achieve intermediate levels of illumination, between white (on) and black (off), pulse-width modulation (PWM) techniques are used. The basic PWM scheme involves first determining the rate at which images are to be presented to the viewer. This establishes a frame rate and a corresponding frame period. For example, in a standard television system, images are transmitted at 30 frames per second, and each frame lasts for approximately 33.3 milliseconds. Then, the intensity resolution for each pixel is established. In a simple example, and assuming n bits of resolution, the frame time is divided into $2^n-1$ equal time slices. For a 33.3 millisecond frame period and n-bit intensity values, the time slice is $33.3/(2^n-1)$ milliseconds.

Having established these times, for each pixel of each frame, pixel intensities are quantized, such that black is 0 time slices, the intensity level represented by the LSB is 1 time slice, and maximum brightness is $2^n-1$ time slices. Each pixel's quantized intensity determines its on-time during a frame period. Thus, during a frame period, each pixel with a quantized value of more than 0 is on for the number of time slices that correspond to its intensity. The viewer's eye integrates the pixel brightness so that the image appears the same as if it were generated with analog levels of light.

For addressing SLMs, PWM calls for the data to be formatted into "bit-planes", each bit-plane corresponding to a bit weight of the intensity value. Thus, if each pixel's intensity is represented by an n-bit value, each frame of data has n bit-planes. Each bit-plane has a 0 or 1 value for each display element. In the PWM example described in the preceding paragraphs, during a frame, each bit-plane is separately loaded and the display elements are addressed according to their associated bit-plane values. For example, the bit-plane representing the LSBs of each pixel is displayed for 1 time slice, whereas the bit-plane representing the MSBs is displayed for $2^n/2$ time slices.

Digital display systems based on SLMs have a fixed image size—the SLM is designed to display an image of a certain horizontal and vertical resolution. This fixed image size of the SLM does not necessarily match the image size of the input signal. If this is the case, the image must be resized to fit the SLM. This resizing has required special processing and memory, with a resultant increase in the cost of the display system. For example, the processing algorithms of image resizers require special line buffers capable of delivering the same line more than once.

SLM-based display system must also keep pace with other types of display systems with regard to the ability to accept input signals carrying compressed video data. Existing decompression processors are either general purpose processors having special decompression programming or are special purpose processors designed for use with a host processor. A need exists for a processor designed especially for use with an SLM-based system.

SUMMARY OF THE INVENTION

One aspect of the invention is a digital video processing unit that receives an input signal carrying compressed video data. It decompresses the video data and resizes the image represented by the data. The processing unit is comprised of two processing "engines"—a decoding engine for decompression and a scaling engine for resizing. These engines share a memory, which stores compressed video data for delivery to the decoding engine and also stores the video data after decompression for delivery to the scaling engine. A memory manager is in communication with the decoding engine, the scaling engine, and the memory. The memory manager provides data as needed, responding to request signals from the decoding engine and the scaling engine. It also generates address signals for storing data in the memory.

An advantage of the invention is that sharing of memory by the decoding engine and scaling engine simplifies the memory requirements of the display system. Specifically, a special line buffer between the decoder and image resizer is not necessary as would be the case in the absence of a shared memory.

BRIEF DESCRIPTION OF THE DRAWINGS

FIG. 1 is a block diagram of a digital image display system, which uses a spatial light modulator to generate full-color full-motion displays, and which has a video processing unit in accordance with the invention.

FIG. 2 is a block diagram of the digital video processing unit of FIG. 1.

FIG. 3 is a block diagram of an alternative embodiment of the digital video processing unit of FIG. 1.

DETAILED DESCRIPTION OF THE INVENTION

System Overview

FIG. 1 illustrates an all-digital image display system 10 in accordance with the invention. Display system 10 comprises a signal interface 11, a video processing unit 13, a picture quality unit 14, a frame buffer 15, a spatial light modulator (SLM) 16, a color wheel 17, a display optics unit 18, and a timing unit 19. FIG. 1 illustrates only those components of a display system significant to main-screen video processing and display. Other components, such as might be used for processing synchronization signals, audio signals, secondary screen features such as closed captioning, or graphics displays, are not shown. The following description is primarily directed to video processing unit 13.

For purposes of this description, system 10 has a DMD-type SLM 16. Comprehensive descriptions of DMD-based display systems, without the features of the present invention, are set out in U.S. Pat. No. 5,079,544, entitled "Standard Independent Digitized Video System", U.S. patent Ser. No. 08/147,249, entitled "Digital Television System", and in U.S. Pat. No. 5,452,024, entitled "DMD Display System", each assigned to Texas Instruments Incorporated and incorporated by reference herein. System 10 could be used with other types of SLMs, such as LCDs.

Signal interface 11 receives digital input signals, such as the digital bitstreams provided by proposed advanced television (ATV) standards. For purposes of this description, it is assumed that the input signal is a compressed data signal. For purposes of example, it is assumed that the data is compressed in accordance with the MPEG standard and contains the data and timing information consistent with that standard. In accordance with the MPEG standard, the data is in YCbCr (color difference) format. However, the invention could be useful for systems that receive data compressed by other methods. The input signal into signal interface 11 might come from any one of a variety of sources, such as a television tuner, a data memory device, or via a computer network.

Signal interface 11 demultiplexes and buffers the input signal to provide compressed video data as well as audio and timing signals. Signal interface 11 has appropriate filters and memory for performing these tasks. For example, an MPEG bitstream may require transport layer demultiplexing.

Video processing unit 13 receives compressed video data from signal interface 11. As explained below in connection with FIG. 2, video processing unit 13 decompresses the data and scales (re-sizes) the resulting image to match the display resolution of SLM 16.

Picture quality unit (PQU) 14 receives the decompressed and scaled video data from video processing unit 13. This data may be referred to as "YCbCr pixel data". PQU 14 performs tasks such as colorspace conversion and de-gamma. Color space conversion converts YCbCr data to RGB data. The data may also undergo a de-gamma process, which linearizes the RGB data by removing the effect of a gamma correction that is processed into video signals at transmission. PQU 14 may also perform error diffusion to reduce quantization artifacts.

Frame buffer 15 receives processed pixel data from PQU 14. It formats the data into "bit-plane" format, and delivers the bit-planes to SLM 16 one at a time. As discussed in the Background, the bit-plane format permits each display element of SLM 16 to be turned on or off in response to the value of one bit of data at a time. The formatting is performed by hardware associated with frame buffer 15.

In a typical display system 10, frame buffer 15 has a "double buffer" memory, which means that it has a capacity for at least two display frames. The buffer for one display frame can be read out to SLM 16 while the buffer for another display frame is being written. The two buffers are controlled in a "ping-pong" manner so that data is continuously available to SLM 16.

The bit-plane data from frame buffer 15 is delivered to SLM 16. Details of a suitable DMD-type SLM 16 are set out in U.S. Pat. No. 4,956,619, entitled "Spatial Light Modulator", which is assigned to Texas Instruments Incorporated and incorporated by reference herein. Essentially, SLM 16 uses the data from bit-plane buffer 15 to address each display element of its display element array. The "on" or "off" state of each display element forms an image. During a frame period, SLM 16 generates an image for each of three different colors (red, green, and blue) of a picture. These three images are sequentially displayed through a color wheel 17. The viewer's eyes integrate the sequential images so that the viewer perceives a full-color picture.

Display optics unit 18 has optical components for illuminating SLM 16, for receiving the image from SLM 16, and for projecting the image to a screen or other image plane. These components include a light source, illumination path optics, and a projection lens.

In other embodiments, three SLMs could be used to concurrently display images of three colors, such as red, green, and blue. These images would be optically combined and perceived by the viewer as a full-color image. Still other embodiments might use two SLMs with images of different colors being either sequential or combined.

Master timing unit 19 provides various system control functions. Timing unit 19 may be implemented with a field programmable gate array (FPGA), to handle different frame resolutions and frame rates.

Video Processing Unit

FIG. 2 is block diagram of digital video processing unit 13. As explained below, video processing unit 13 combines decompression and image resizing operations. Separate processing "engines" 24 and 25 perform these operations, first decompression and then resizing. These engines 24 and 25 share a memory 23 that stores the data to be operated on. A request-driven memory manager 22 handles the tasks of supplying the proper data at the proper time to each engine 24 and 25.

A feature of the invention is that the components of video processing unit 13 are designed so that they can be fabricated with integrated circuits. For example, the processing engines 24 and 25 and the memory manager 23 might be fabricated as one integrated circuit. This type of circuit is often referred to as an ASIC (application specific integrated circuit), with the applications being decompression and re-sizing of digital image data. As another example, memory 23 might also be "on-chip", such that the entire video processing unit 13 is a single integrated circuit.

Control interface 21 may be included to handle various control signals. For example, control interface 21 might receive and handle signals that support onscreen displays or override scaling for a picture-in-picture. If included, control interface 21 would typically interface to a main system processor of system 10.

Memory manager 22 receives the compressed video data and stores it in memory 23. Memory manager 22 handles the task of providing the appropriate data at the appropriate times to decoding engine 24 and scaling engine 25. The specific tasks of memory manager 22 are to: extract compressed data from interface 11 and place it in memory 23, move compressed data from memory 23 to decoding engine 24, move decompressed data from decoding engine 24 back into memory 23, move decompressed data from memory 23 to scaling engine 25, and arbitrate any conflicting requests for data from the decoding engine 24 and the scaling engine 25.

Memory manager 22 is request-driven, in that data is delivered to decoding engine 24 and scaling engine 25 in response to requests for data from these engines. Memory manager 22 may be implemented as a hardcoded microcontroller.

Memory 23 may be comprised of conventional dynamic random access memory devices (DRAMs). The size of memory 23 is related to various factors, such as the image resolution and the compression ratio. Typically, memory 23 is sufficiently large to permit simultaneous storage of at least part of a frame of compressed data being read in, a frame being processed, and at least part of a frame of decompressed data being read out. A typical size of memory 23 might be 16 megabits for a standard definition signal.

A memory bus 22a between memory manager 22 and memory 23 carries data, addresses, and the control signals necessary for reading and writing memory 23. The control signals include a write enable and column and row address strobes.

Decoding engine 24 is a processor programmed to decompress the video data. It may be programmed to support various compression standards, such as the JPEG, MPEG, MPEG2, Px64, CCITT, etc. The programming can be for either still or full-motion decompression algorithms. Decoding engine 24 could be a multi-format decoding engine, switchable between decompression algorithms to perform whatever decompression method is appropriate for the input signal. The output of decoding engine 24 is decompressed pixel data which, in the example of this description, is in YCbCr format.

An example of a suitable decoding engine 24 is the decoding engine of the CL450 MPEG Video Decoder manufactured by C-Cube Microsystems. It provides decompressed YCrCb data with an image size consistent with the input signal.

A decoding engine bus 22b carries control information and data between decoding engine 24 and memory manager 22. The control information includes requests for data from decoding engine 24, which requests data as needed for processing. In response to a request, memory manager 22 generates the address of the next data to be decoded, retrieves the data from memory 23, and delivers it to decoding engine 24. Bus 22b is bidirectional—after decompression, decoding engine 24 delivers the data back to memory manager 22, which generates an address for storing it in memory 23.

Scaling engine 25 operates on the decompressed video data. Essentially, scaling engine 25 is a processor programmed to scale the image to resize the image to the display size (resolution) of SLM 16. As stated in the Background, SLM 16 does not always have a display resolution that matches the resolution of the input signal. For example, a typical SLM 16 might have a display resolution of 1280×1024, whereas, for HDTV, full transmission resolution is 1920×1080 pixels. Scaling engine 25 upscales or downscales the input signal to fit the SLM size in either or both dimensions. Horizontal scaling changes the number of active pixels per line and vertical scaling changes the number of active lines per frame. Various scaling algorithms are known in the art of image processing, such as those that use interpolation or FIR filtering.

As an example of the scaling process, the image represented by the decompressed data from decoding engine 24 might be smaller than the display size of SLM 16, both vertically and horizontally. For vertical scaling, scaling engine 25 would generate new lines of data by filtering neighboring lines of the existing image, requesting these neighboring lines as needed. It may need the same line more than once during this process. Likewise, for horizontal scaling, scaling engine 25 would generate new pixels by filtering neighboring pixels of the existing image, requesting them from memory manager 22 as needed.

Scaling engine 25 is provided with input and output image size parameters. The output size of the image is determined by the display size of SLM 16. The input image size is provided by decoding engine 24, which decodes this data from the compressed video data stream.

A scaling engine bus 22c carries control signals and data between scaling engine 25 and memory manager 22. The control signals include requests for data as needed for processing. After scaling, the video data is delivered to PQU 14.

An example of a suitable scaling engine 25 is the scaling engine of the Acuity Resizer device, manufactured by Genesis Microchip, Inc. The Acuity gm833x2 device operates on YCbCr data, using FIR filters on two separate channels.

FIG. 3 illustrates an alternative embodiment of video processing unit 13. A feature of this embodiment is that memory 33 has two data output ports and delivers data directly to decoding engine 24 or to scaling engine 25. The dual output ports can be used to meet high bandwidth demands. Like the embodiment of FIG. 2, the data is delivered in response to requests delivered to memory manager 32. The memory bus 32a carries a signal that indicates the destination of the requested data.

Like the embodiment of FIG. 2, the video processing unit 13 of FIG. 3 may be easily fabricated as two integrated circuits, one for decoding engine 24, scaling engine 25, and memory manager 32, and the other for memory 33. Alternatively, video processing unit 13 could be fabricated as a single integrated circuit.

Other Embodiments

Although the present invention has been described in detail, it should be understood that various changes, substitutions, and alterations can be made hereto without departing from the spirit and scope of the invention as defined by the appended claims.

What is claimed is:

1. A digital video processing unit that decompresses an input signal carrying compressed video data and resizes the image represented by the data, comprising:

a decoding engine programmed to decompress said compressed video data, thereby providing decompressed video data;

a scaling engine programmed to scale said decompressed video data;

a memory that stores said compressed video data prior to delivery to said decoding engine and stores said decompressed video data prior to delivery to said scaling engine; and a memory manager in data communication with said decoding engine, said scaling engine, and said memory, said memory manager operable to respond to data request signals from said decoding engine and from said scaling engine and operable to generate address signals for storing data in said memory;

wherein said memory has a single data port that delivers said compressed video data and said decompressed video data to said memory manager.

2. The video processing unit of claim 1 wherein said decoding engine, said scaling engine and said memory manager are a single integrated circuit.

3. The video processing unit of claim 1, wherein said video processing unit including said memory is a single integrated circuit.

4. The video processing unit of claim 1, wherein said memory has a first output port that delivers said compressed video to said decoding engine and a second output port that delivers said decompressed video data to said scaling engine.

5. The video processing unit of claim 1 wherein said compressed video data is compressed in accordance with the MPEG standard and wherein said decoding engine is programmed to perform MPEG decompression.

6. The video processing unit of claim 5 wherein said compressed video data is in YCbCr format.

7. The video processing unit of claim 1, wherein said decoding engine is programmed to decode input image size data from said compressed video data and is in data communication with said scaling engine to deliver said input image size data to said scaling engine.

8. A video display system having a spatial light modulator with a display size, comprising:

a signal interface that receives a compressed video signal;

a video processing unit having a decoding engine programmed to decompress said compressed video data thereby providing decompressed video data, a scaling engine programmed to resize said decompressed video data to match said display size thereby providing YCbCr pixel data, and a shared memory accessible by said decoding engine and said scaling engine;

a picture quality unit operable to convert said YCbCr pixel data to RGB pixel data;

a frame buffer operable to format said RGB pixel data into bit-plane format and to deliver said RGB pixel data to said spatial light modulator and;

at least one spatial light modulator operable to display images based on said RGB pixel data; and display optics operable to direct said images to an image plane.

9. The video display system of claim 8, wherein said decoding engine and said scaling engine are a single integrated circuit.

10. The video display system of claim 8, wherein said video processing unit is a single integrated circuit.

11. The video display system of claim 8, wherein said memory has a first output port that delivers said compressed video to said decoding engine and a second output port that delivers said decompressed video data to said scaling engine.

12. The video display system of claim 8, wherein said video processing unit further comprises a request-driven memory manager.

13. The video display system of claim 12, said video processing unit further including a memory manager to manage said shared memory, wherein said decoding engine, said scaling engine, and said memory manager are a single integrated circuit.

14. The video display system of claim 12, wherein said memory has a single data port that delivers said compressed video and said decompressed video data to said memory manager.

15. The video display system of claim 8, wherein said compressed video data is compressed in accordance with the MPEG standard and wherein said decoding engine is programmed to perform MPEG decompression.

* * * * *